Feb. 23, 1932.　　　W. A. KARSOE　　　1,846,971
AUTO WHEEL JACK
Filed April 11, 1930
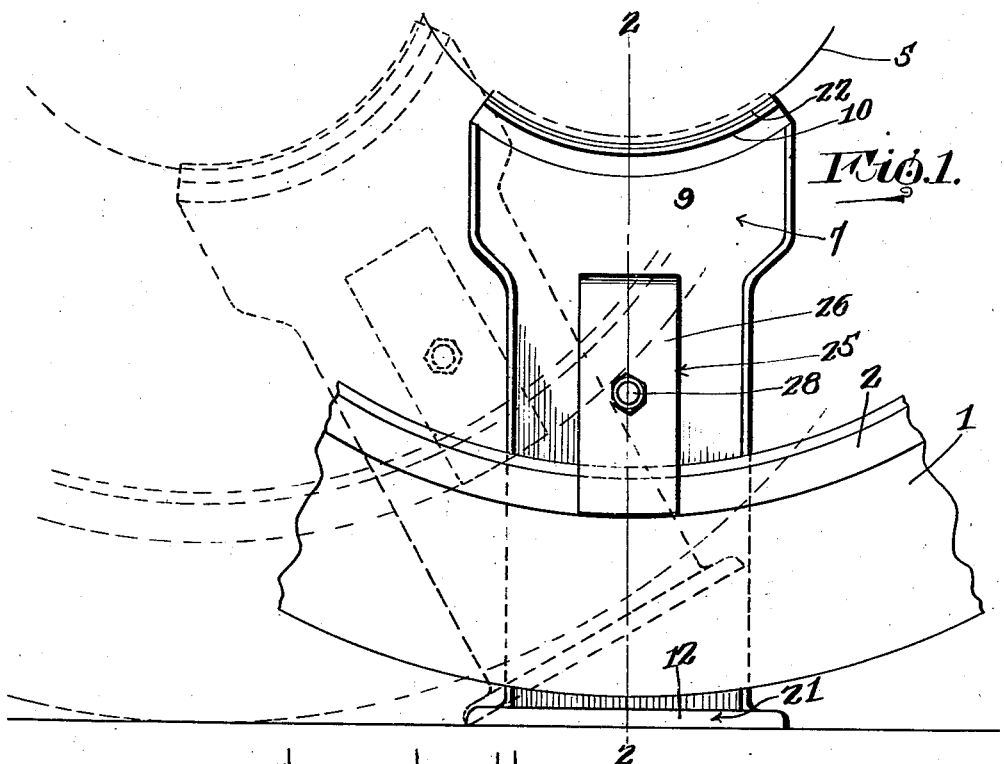
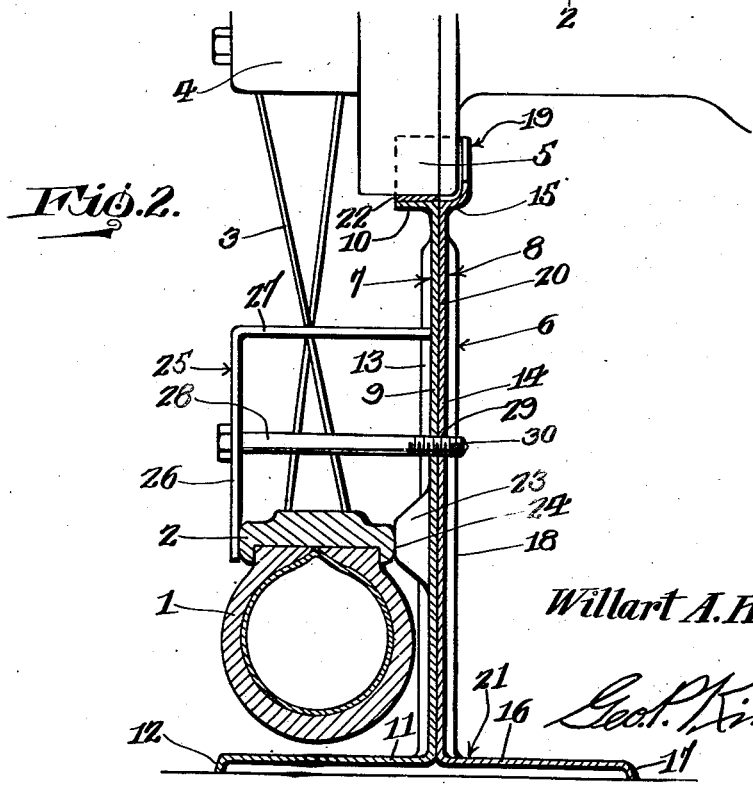
Inventor
Willart A. Karsoe
Geo. P. Kimmel
Attorney Patented Feb. 23, 1932

1,846,971

UNITED STATES PATENT OFFICE

WILLART ANDREAS KARSOE, OF FLINT, MICHIGAN

AUTO WHEEL JACK

Application filed April 11, 1930. Serial No. 443,435.

This invention relates to a jack designed primarily for jacking up wheels of automotive vehicles, but it is to be understood that a jack, in accordance with this invention, may be employed for any purpose for which it is found applicable, and the invention has for its object to provide, in a manner as hereinafter set forth, a jack including a head coacting with the brake drum of a wheel of an automotive vehicle for quickly jacking up the wheel on the rearward turn of the latter.

A further object of the invention is to provide, in a manner as hereinafter set forth, a jack including means for connecting it to the wheel which is to be jacked up, and with such means constructed and arranged to prevent the wheel being jacked from shifting off the jack during the elevating of the wheel and when the latter is supported by the jack in an elevated position.

A further object of the invention is to provide, in a manner as hereinafter set forth, a jack for the purpose referred to including a head for coacting with the brake drum of the wheel to be jacked, and with the head provided with means to prevent the slipping of the brake drum relative to the head during the jacking up operation.

Further objects of the invention are to provide, in a manner as hereinafter set forth, a jack for the purpose referred to, which is simple in its construction, strong, durable, compact, thoroughly efficient in its use, providing for a quick elevating of the vehicle wheel, readily assembled, and comparatively inexpensive to manufacture.

With the foregoing and other objects in view the invention consists of the novel construction, combination and arrangement of parts as hereinafter more specifically described, and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a front elevation of a jack, in accordance with this invention, showing the adaptation thereof with respect to a vehicle wheel and illustrating in full line the jack in active position for jacking of the wheel above the ground, and in dotted lines illustrating the initial position of the jack prior to its being shifted to vertical or perpendicular position for the purpose of retaining the wheel above the ground.

Figure 2 is a section on line 2—2, Figure 1.

Referring to the drawings in detail, 1 denotes the tire, 2 the rim, 3 the spokes, 4 the hub and 5 the brake drum of a wheel of an automotive vehicle.

The jack is referred to generally at 6 and includes a front section 7 and a rear section 8 which are fixedly secured together, that is to say, the rear face of the section 7 opposes the forward face of the section 8 and the sections are secured together with such faces in abutting relation.

The section 7 is constructed from sheet metal of the desired gauge, width and height and is vertically disposed. The section 7 includes an intermediate part 9, an upper part 10 and a lower part 11. In cross section the part 10 is disposed at right angles with respect to the upper end of the part 9. The top edge of part 9 is of arcuate contour and the part 10 conforms in contour to that of the top edge of the part 9. The part 10 projects outwardly from the part 9 and its cross sectional length is materially greater than the thickness of part 9. The part 11 projects outwardly at right angles with respect to the lower end of part 9 and is of a width greater than the width of part 9. The part 11 is formed with a depending flange 12 at its front and sides. The outer face of part 9 is formed with a reinforcing flange 13.

The section 8 includes an intermediate part 14 corresponding in length and width to the part 9 of section 7. The section 8 is formed of sheet metal of a gauge the same as that of section 7. Section 8 further includes a rearwardly directed upper part 15 which is integral with the upper end of the part 14 and is of angle-shaped cross section. The section 8 also includes a lower part 16 which projects at right angles to the lower end of part 14. The upper end of part 14 is of arcuate contour and the upper part 15 corresponds in contour to that of the top of part 14. The part 16 is of a width greater than the width of part 14 and is provided at its rear and sides with a depending flange 17. The outer face of the part 14 is provided with a reinforcing flange 18. The cross sectional length of the upper part 15 of section 8 is less than the cross sectional length of the upper part 10 of section 7. The bottom of the upper part 15 of section 8 has its upper face flush with the upper face of the upper part 10 of section 7. The curvature of part 15 of section 8 conforms to the curvature of the part 10 of section 7. The length of part 15 of section 8 corresponds to the length of part 10 of section 7.

The parts 10 and 15 coact to provide a partial cylindrical head 19 of angled cross section at any point throughout the length thereof to provide a horizontal and a vertical leg. The parts 9 and 14 coact to provide a vertically disposed standard 20 having the head 19 integral with the upper end thereof. The parts 11 and 16 coact to provide a base 21 which is integral with the lower end of the standard 20 and projects forwardly and rearwardly with respect to the standard. The head 19, when the jack is used has its axis perpendicular to the wheel and projects outwardly from and inwardly of parts 9 and 14 respectively, and by this arrangement the weight of the wheel is distributed on opposite sides of the standard to reduce tipping over of the jack to a minimum.

That part of the head 19 provided by the part 10 of the section 7 has secured upon its upper face a curved plate 22 of any suitable material possessing the characteristic to prevent slipping of the drum 5 with respect to the head 19 when the wheel is being jacked.

The outer face of the part 9 of section 7 is provided at a point below its transverse median with an outwardly projecting lug 23 having its forward face flattened as at 24. Coacting with the lug 24 is a clamping device which functions in connection with the lug 23 as a means for coupling the rim 2 to the jack 6 and also for clamping the wheel to the jack to prevent the turning of the wheel when the latter is jacked up. The clamping device consists of an angle-shaped member 25 formed of a vertical leg and a horizontal leg indicated at 26, 27 respectively. The leg 26 depends from the outer end of leg 27. The leg 27 is arranged to abut against the forward face of the part 9 of section 7. The lower end of leg 26 opposes the lug 23 in spaced relation and between such lower end of the leg is adapted to be positioned the rim 2 of the tire. The clamping device further includes a clamping bolt 28 which extends through the leg 26 and has threaded engagement with the standard 20, as the latter is formed with an opening 29 having a threaded wall for engagement with the threads 30 of the bolt 28. The clamping device in connection with the lug 23 prevents the shifting of the jack laterally relative to the drum 5.

The manner in which the jack operates to sustain the wheel in elevated position is shown in dotted and full lines in Figure 1. The dotted line showing illustrates the position of the jack prior to its position for sustaining the wheel in elevated position. The jack is interposed at an inclination between the drum 5 and the ground, the head bearing against the drum and one side edge of the base seating on the ground. When the jack is shifted from its inclined position as shown in dotted lines in Figure 1 to the perpendicular position shown in full lines in Figure 1, on revolving the wheel rearwardly, the latter will be elevated and jacked up. As the rim 2 is positioned between the leg 26 and lug 23 the wheel will be coupled with the jack when the latter is disposed at an inclination and when it assumes its perpendicular position. After the jack has assumed its perpendicular position the bolt 28 can be adjusted to bring the leg 26 in clamping engagement with the rim 2; under such conditions the wheel is clamped to the jack between leg 26 and lug 23 and cannot rotate. The wheel when not clamped can be rotated, but at the same time it will be connected with the jack, by the clamping device.

It is thought the many advantages of a jack, in accordance with this invention and for the purpose set forth can be readily understood, and although the preferred embodiment of the invention is as illustrated and described, yet it is to be understood that changes in the details of construction can be had which fall within the scope of the invention as claimed.

What I claim is:

1. A wheel jack comprising a rectangular base, a side flanged standard disposed at the longitudinal median of the base and merging at its upper end into a partial cylindrical head of angle shaped cross section projecting outwardly and inwardly with respect to said end and having its axis perpendicular to the wheel, and a lug at the forward face of the standard, disposed at a point between the transverse median and the lower end of the standard and at the vertical median of the latter for abutting one side of the wheel when the latter is sustained by the jack.

2. A wheel jack comprising a rectangular base, a side flanged standard disposed at the longitudinal median of the base and merging at its upper end into a partial cylindrical head of angle shaped cross section projecting outwardly and inwardly with respect to said end and having its axis perpendicular to the wheel, a lug at the forward face of the standard, disposed at a point between the transverse median and the lower end of the standard and at the vertical median of the latter for abutting one side of the wheel when the latter is sustained by the jack, and means projecting forwardly from the standard and coacting with said lug for connecting the wheel to be jacked therewith when the jack is shifted from inclined to perpendicular position to jack up the wheel.

3. A wheel jack comprising a rectangular base, a side flanged standard disposed at the longitudinal median of the base and merging at its upper end into a partial cylindrical head of angle shaped cross section and aligning throughout with the base, said head projecting outwardly and inwardly with respect to said end, having its axis perpendicular to the wheel and formed of a horizontal and a vertical leg, a lug on the forward face of the standard, disposed at a point between the transverse median and the lower end of the standard and at the vertical median of the latter for abutting one side of the wheel when sustained by the jack, and an anti-slipping means positioned upon the upper face of the horizontal leg of the head.

4. A wheel jack comprising a standard, a base at the lower end of the latter, and a partial cylindrical head integral with the upper end of the standard, of angle shaped cross section, projecting outwardly and inwardly with respect to said upper end and having the axis thereof perpendicular to the wheel.

5. A wheel jack comprising a standard, a base at the lower end of the latter, and a partial cylindrical head integral with the upper end of the standard, of angle shaped cross section, projecting outwardly and inwardly with respect to said upper end and having the axis thereof perpendicular to the wheel, the upper portion of said standard being of greater width than its lower portion and the length of the head corresponding to the width of the upper end of the standard.

6. A wheel jack comprising a standard, a base at the lower end of the latter, and a partial cylindrical head integral with the upper end of the standard and of angle shaped cross section to provide a vertical and a horizontal leg, said horizontal leg projecting outwardly and inwardly with respect to the upper end of the standard, the axis of said head being perpendicular to the wheel, and an anti-slipping element secured upon the upper face of said horizontal leg and of a length corresponding to the length of the latter.

7. A wheel jack comprising a standard, a base at the lower end of the latter, a partial cylindrical head integral with the upper end of the standard, of angle shaped cross section, projecting outwardly and inwardly with respect to said upper end and having the axis thereof perpendicular to the wheel, said standard having its outer face provided with a lug to abut one side of the wheel sustained by the jack, and means carried by the standard at the front thereof and coacting with the lug for connecting to the jack the wheel sustained thereby.

8. A wheel jack of that type tiltable from an inclined to a perpendicular position for jacking up the wheel of an automotive vehicle, the combination of a standard, a base at the lower end of the latter, a partial cylindrical head integral with the upper end of the standard, projecting outwardly and inwardly with respect to said upper end and having its axis perpendicular to the wheel, said standard provided with a lug at the vertical median of its outer face, said head adapted to be seated against the brake drum of the wheel, and means coacting with said lug for connecting the wheel to be jacked against the latter when the jack is shifted from inclined to perpendicular position to jack up the wheel.

In testimony whereof, I affix my signature hereto.

WILLART ANDREAS KARSOE.